(12) United States Patent
Hayashi

(10) Patent No.: US 7,006,133 B1
(45) Date of Patent: Feb. 28, 2006

(54) IMAGE INPUT APPARATUS OPERABLE UNDER LOW POWER CONSUMPTION WITHOUT EMPLOYING BUFFER MEMORY

(75) Inventor: Hisao Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 427 days.

(21) Appl. No.: 09/272,683

(22) Filed: Mar. 19, 1999

(30) Foreign Application Priority Data

Mar. 20, 1998 (JP) ............................................ 10-071898

(51) Int. Cl.
*H04N 5/225* (2006.01)

(52) U.S. Cl. .................................. 348/222.1; 348/207.1
(58) Field of Classification Search .............. 348/207.1, 348/207.11, 552, 207.2, 222.1, 372, 88, 91, 348/132, 127
See application file for complete search history.

(56) References Cited

U.S. PATENT DOCUMENTS

| | | | | |
|---|---|---|---|---|
| 4,896,211 A | * | 1/1990 | Hunt et al. .................... | 348/88 |
| 5,787,259 A | * | 7/1998 | Haroun et al. ............... | 348/552 |
| 5,821,994 A | * | 10/1998 | Tani ........................... | 348/207 |

FOREIGN PATENT DOCUMENTS

| | | |
|---|---|---|
| JP | 1-284078 | 11/1989 |
| JP | 2-194776 | 8/1990 |
| JP | 4-96582 | 3/1992 |
| JP | 5-252477 | 9/1993 |
| JP | 6-98251 | 4/1994 |
| JP | 9-116818 | 5/1997 |

OTHER PUBLICATIONS

Japanese Office action issued Jan. 30, 2001 in a related application with English translation of relevant portions.
Japanese Office Action issued Feb. 8, 2000 in a related application with English translation of relevant portions.

Tom Bararducci, Jay Endsley, Wayne Prentice: "A Digital Camera Using a Universal Serial Bus (USB) Interface," Final Program Proc. IS&T $50^{th}$ Annu. Conf. (1997).

Akira Uchida, "A Conical Digital Camera Q–EZ," Shashin Kogyo (Photographic Industry), vol. 55, No. 2, pp. 11–14 (Feb., 1997).

* cited by examiner

*Primary Examiner*—Wendy R. Garber
(74) *Attorney, Agent, or Firm*—Dickstein, Shapiro, Morin & Oshinsky, LLP.

(57) ABSTRACT

A compact image input apparatus is operable under low power consumption, while omitting a buffer memory for storing image data, which is originally required to transfer image data between this image input apparatus and a personal computer. The image input apparatus is arranged by an image sensor for optically sensing an image of an object to produce an analog image signal; an A/D (analog-to-digital) converter for A/D-converting the analog image signal derived from the image sensor into a digital image signal; an interface control unit for converting the digital image signal derived from the A/D converter into image data; an image sensor driving unit for driving the image sensor; an A/D converter driving unit for driving the A/D converter; a clock oscillator for oscillating a clock signal; a clock switching control unit for controlling a supply of the clock signal to the image sensor driving unit and the A/D converter driving unit in response to the clock signal produced from the clock oscillator, and both a transfer starting signal and a transfer clock signal supplied from the interface control unit; and a personal computer for receiving the image data converted by the interface control unit and for supplying the transfer starting signal to the interface control unit. The clock switching control unit includes drive means for supplying the clock signal produced form the clock oscillator to the image sensor, and also for not supplying the clock signal to the A/D converter driving unit within a preset time period after the transfer starting signal is received.

13 Claims, 2 Drawing Sheets

IMAGE INPUT APPARATUS OPERABLE UNDER LOW POWER CONSUMPTION WITHOUT EMPLOYING BUFFER MEMORY

BACKGROUND OF THE INVENTION

1. Field of the invention

The present invention generally relates to an image input apparatus for inputting image information of an imaging object. More specifically, the present invention is directed to such a compact/low-cost image input apparatus operable under low power consumption without employing a buffer memory, while driving a CCD only during an imaging operation.

2. Description of the Related Art

While high grade type personal computers are commercially available and are popularized, various image applications such as television telephone, video mails, and electric albums are normally used. As a result, image input apparatuses used for personal computers, known as digital cameras, are gradually popularized. On the other hand, portable terminals such as notebook type personal computers and PDAs are developed, and are commercially available. Recently, cameras are connected to these portable terminals, or are assembled into these portable terminals. These cameras operable with the portable terminals must be made compact for the sake of portability thereof. In addition, since these portable terminals are mainly operated by batteries, the power consumption thereof must be reduced. Furthermore, since cameras are assembled into PHS and portable telephone, cost of these portable terminals must be lowered.

In one typical conventional image input apparatus used with a personal computer, there are provided; a lens for forming image light of an imaging object; a CCD for receiving the image light transferred from this lens; an A/D converter for converting an analog image signal derived from this CCD into digital image data; a buffer memory device for temporarily storing the digital image data derived from this A/D converter; an interface control unit for reading the digital image data from this buffer memory device to convert this read image data, and for transferring this converted image data to a personal computer; and further a drive control unit for controlling drive operations of these units.

However, the above-described conventional image input apparatus owns the following problems. That is, in the conventional image input apparatus for the personal computer, both the CCD and the A/D converter are driven in the constant time period to read the image data, whereas the transfer clock used between this image input apparatus and the personal computer is not produced in a constant time period, due to the load variation of the CPU. As a result, the buffer memory device capable of storing thereinto the image data is necessarily provided between the A/D converter and the interface control unit. Accordingly, this conventional image input apparatus for the personal computer is not suitable for compact/low power consumption/low cost aspects.

SUMMARY OF THE INVENTION

The present invention has been made to solve the above-explained problems, and therefore, has an object to provide a compact image input apparatus operable under low power consumption, and made in low cost. To achieve the above-described object, an image input apparatus, according to a first aspect of the present invention, is featured by comprising:

an image sensor for optically sensing an image of an object to produce an analog image signal;

an A/D (analog-to-digital) converter for A/D-converting the analog image signal derived from the image sensor into a digital image signal;

an interface control unit for converting the digital image signal derived from the A/D converter into image data;

an image sensor driving unit for driving the image sensor;

an A/D converter driving unit for driving the A/D converter;

a clock oscillator for oscillating a clock signal;

a clock switching control unit for controlling a supply of the clock signal to the image sensor driving unit and the A/D converter driving unit in response to the clock signal produced from the clock oscillator, and both a transfer starting signal and a transfer clock signal supplied from the interface control unit; and a personal computer for receiving the image data converted by the interface control unit and for supplying the transfer starting signal to the interface control unit; wherein:

the clock switching control unit includes: drive means for supplying the clock signal produced from the clock oscillator to the image sensor, and also for not supplying the clock signal to the A/D converter driving unit within a preset time period after the transfer starting signal is received.

Furthermore, to achieve the object, an image input apparatus, according to a second aspect of the present invention, is featured by comprising:

an image sensor driving unit for driving the image sensor;

an A/D converter driving unit for driving the A/D converter;

a clock oscillator for oscillating a clock signal;

a clock switching control unit for controlling a supply of the clock signal to the image sensor driving unit and the A/D converter driving unit in response to the clock signal produced from the clock oscillator, and both a transfer starting signal and a transfer clock signal supplied from the interface control unit; and a personal computer for receiving the image data converted by the interface control unit and for supplying the transfer starting signal to the interface control unit; wherein:

the clock switching control unit includes:

first drive means for supplying the clock signal produced form the clock oscillator to the image sensor, and also for not supplying the clock signal to the A/D converter driving unit within a first preset time period after the transfer starting signal is received; and second drive means for supplying the transfer clock signal derived from the interface control unit to both the image sensor driving unit and the A/D converter driving unit within a second preset time period after the first preset time period has passed.

Also, in the image input apparatus according to the first, or second aspect of the present invention, the image sensor includes: a lens for focusing the image of the object; and a CCD (charge-coupled device) for receiving the object image focused by the lens to produce the analog image signal.

Also, in the image input apparatus according to the first, or second aspect of the present invention, the clock oscillator oscillates a clock signal having a substantially constant frequency higher the the normal clock frequency.

Moreover, in the image input apparatus according to the first, or second aspect of the present invention, the interface control unit is constituted based upon the USB (universal serial bus interface standard.

Alternatively, the interface control unit is constituted based on the IEEE 1394 specification.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Referring to drawings, various preferred embodiments of the present invention will be described in detail.

Arrangement of Image Input Apparatus

Figure 1:
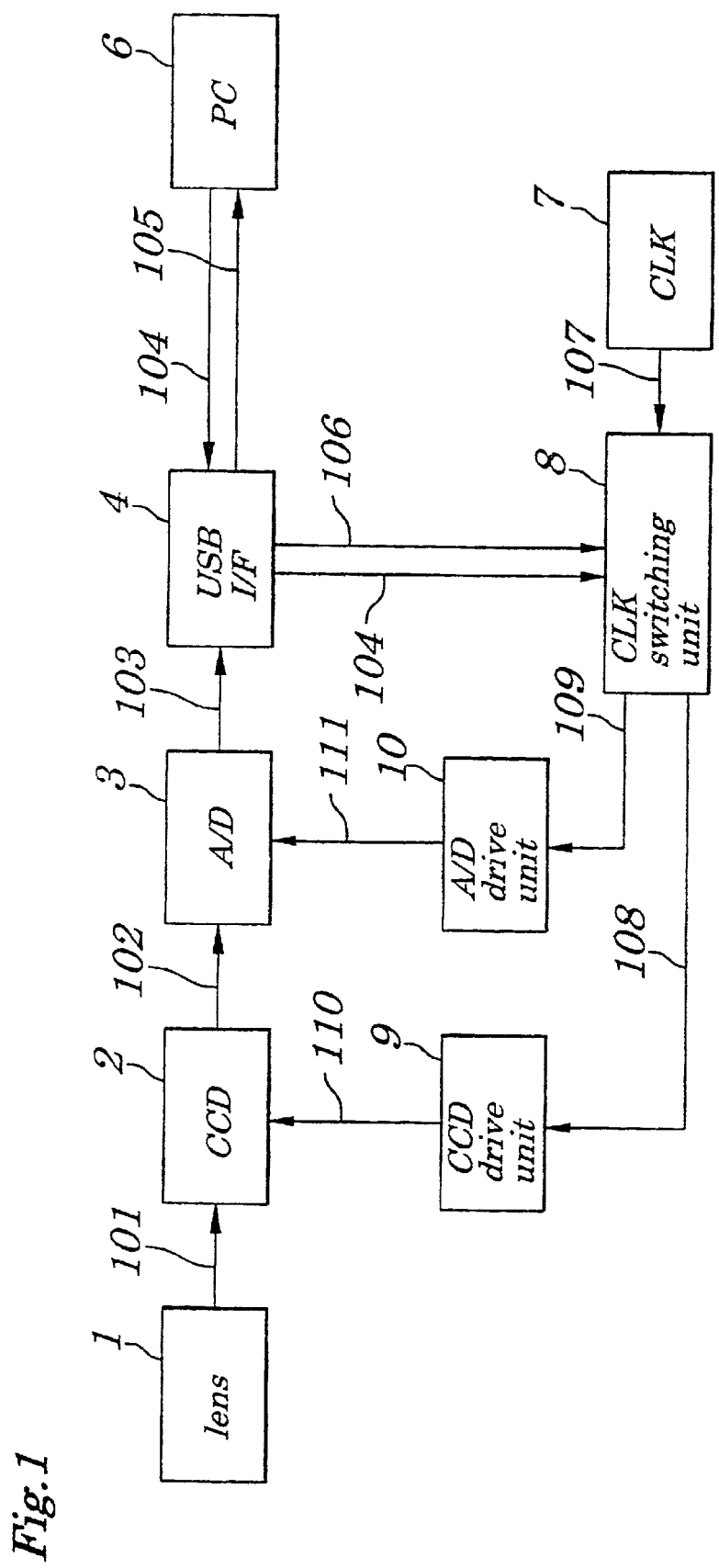
FIG. 1 is a schematic block diagram for representing a circuit arrangement of an image input apparatus according to an embodiment of the present invention.

As indicated in FIG. 1, an image input apparatus, according to an embodiment of the present invention, is mainly constituted by a lens 1, a CCD (charge-coupled device) 2, an A/D (analog-to-digital) converter 3, an USB (universal serial bus) interface control unit 4, a personal computer 6, a clock oscillator 7, a clock switching unit 8, a CCD drive unit 9, and an A/D converter drive unit 10.

Concretely specking, the lens 1 focuses image light 101 of an imaging object (not shown) onto the CCD 2. Upon receipt of the image light 101 derived from the lens 1, the CCD 2 produces an analog image signal 102 to be outputted. The A/D converter 3 converts the analog image signal 102 entered from the CCD 2 into a digital image signal 103 corresponding thereto. The USB interface control unit 4 converts the digital image signal 103 entered from the A/D converter 3 into USB image data 105, and then supplies this USB image data 105 to the personal computer 6.

On the other hand, the USB interface control unit 4 supplies both a transfer starting signal 104 entered from the personal computer 6 and a transfer clock signal 106 appearing on the USB interface control unit 4 to the clock switching unit 8. The clock oscillator 7 oscillates a highspeed clock signal 107 having a constant frequency and then outputs this highspeed clock signal 107 to the clock switching unit 8. This clock switching unit 8 does not output both the clock signal 108 and the clock signal 109 until the transfer starting signal 104 is received from the USB interface control unit 4. Upon receipt of this transfer starting signal 104 supplied from the personal computer 6, the clock switching unit 8 firstly outputs the highspeed clock signal 107 entered from the clock oscillator 7 as a clock 108 until the count value reaches one constant count value (a) after the transfer starting signal has been received. Next, in such a case that the count value reaches a predetermined count value (a) and until this count value reaches a next constant count value (b), the clock switching unit 8 outputs the transfer clock signal 106 entered from the USB interface control unit 4 as the clock 108 and another clock 109. Next, the clock switching unit 8 again does not output both the clock 108 and the clock 109 when the count value reaches the above-described next constant count value (b).

The CCD drive unit 9 produces a CCD drive signal 110 by using the clock signal 108 as an original oscillation signal. As a consequence, when no clock signal 108 is entered, this CCD drive unit 9 never outputs such a CCD drive signal 110. On the other hand, when the highspeed clock signal 107 is entered as the clock signal 108 to the CCD drive unit 9, this CCD drive unit 9 outputs a highspeed CCD drive signal 110 in synchronism with this highspeed clock signal 107, whereas when the transfer clock signal 106 is entered thereto, this CCD drive unit 9 outputs a CCD drive signal 110 in synchronism with this transfer clock signal 106.

The A/D converter drive unit 10 produces an A/D converter drive signal 111 by using the clock signal 109 as an original oscillation signal. As a consequence, when no clock signal 109 is entered, this A/D converter drive unit 10 never outputs such an A/D converter drive signal 111. On the other hand, when the transfer clock signal 106 is entered as the clock signal 109, this A/D converter drive unit 10 outputs an A/D converter drive signal 111 in synchronism with this transfer clock signal 106.

Operation of Image Input Apparatus

Figure 2:
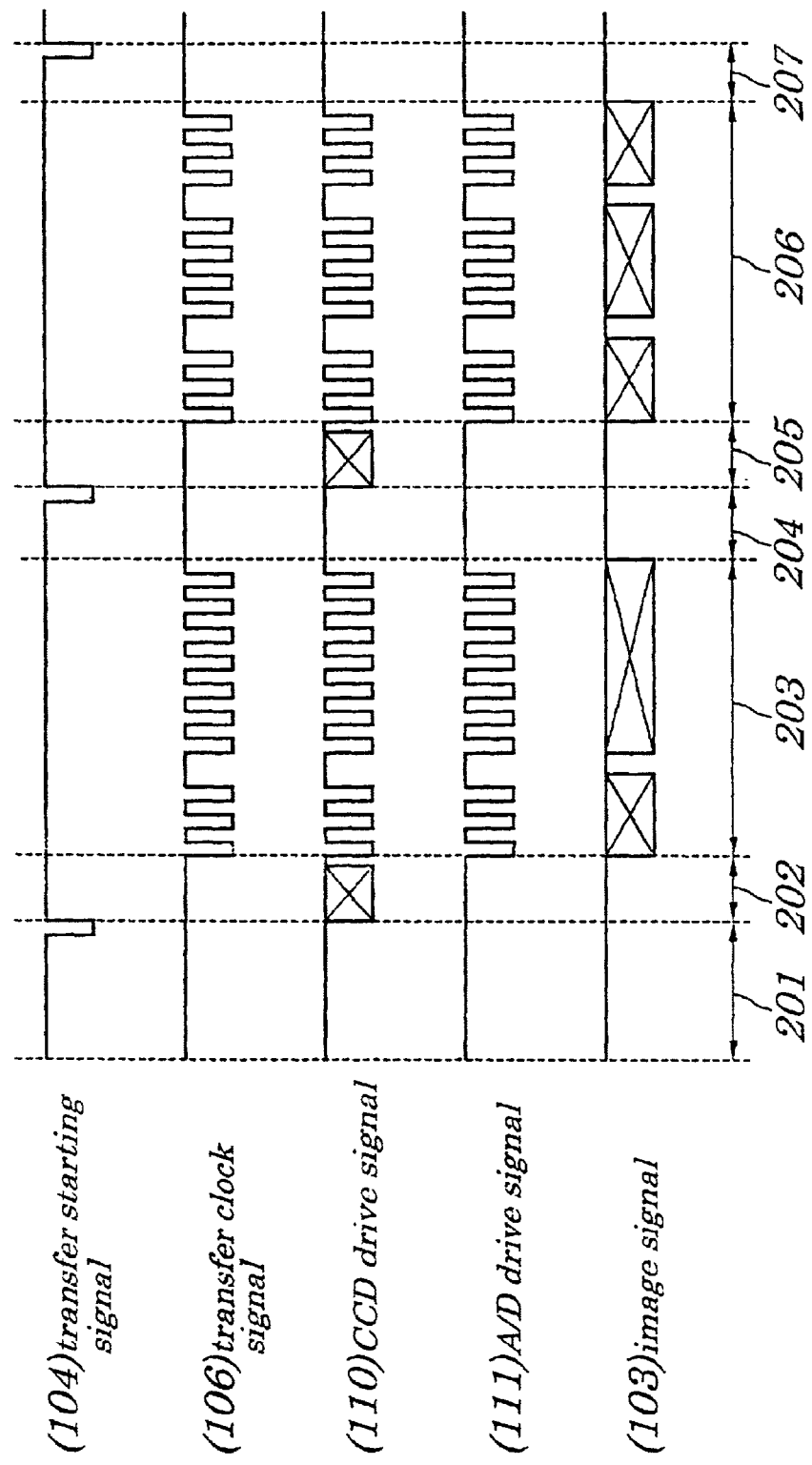
FIG. 2 represents a timing chart for explaining operation of the image input apparatus.

FIG. 2 is a timing chart for explaining operation of the above-described image input apparatus, according to the embodiment, shown in FIG. 1. Within a time period of 201, since the clock switching unit 8 does not detect the transfer starting signal 104, neither the CCD drive signal 110, nor the A/D converter drive signal 111 is outputted therefrom. Within the next time period of 202, since the clock switching unit 8 detects the transfer starting signal 104, a drive signal in synchronism with the highspeed clock signal 107 is outputted as the CCD drive signal 110 therefrom until the count value reaches the constant count value (a). As a result, while the analog image signal 102 is outputted from the CCD 2 in a high speed, the A/D converter drive signal 111 is not outputted from the A/D converter drive unit 10, so that this analog image signal 102 is discarded at this stage. In the subsequent time period of 203, the transfer clock signal 106 is outputted as the CCD drive signal 110 and the A/D converter drive signal 111 until the count value reaches the constant count value (b). As a result, the analog image signal 102 is outputted from the CCD 2, and thereafter is A/D-converted into the digital image signal 103 by the A/D converter 3. Then, this digital image signal 103 is transferred to the personal computer 6.

Within the next time period of 204, both the CCD drive signal 110 and the A/D converter drive signal 111 are not again outputted. This operation condition is equal to that of the above-explained time period of 201. The image input apparatus repeatedly performs the above-explained operation. Now, the reason why both the CCD drive signal 110 and the A/D converter drive signal 111 are not outputted within the first time period of 201 will be explained as follows: In general, a semiconductor device, or element consumes electric power in direct proportional to an operation clock thereof. Within the first time period of 201, since the personal computer 6 does not request the image input apparatus to transfer the image signal, this image input apparatus is not required to image the imaging object, but also both the CCD 2 and the A/D converter 3 need not be driven. At this time, if producing of both the CCD drive signal 110 and the A/D converter drive signal 111 is interrupted, then the overall power consumption of this image input apparatus can be reduced. Subsequently, the reason why the analog image signal 102 is discarded within the time period of 202 will be explained as follows: In general, a photodiode of a CCD photo-converts incident light into electric charges. These electric charges are sequentially transferred by this CCD to be outputted as a serial signal. On the other and, since the electric charges are continuously accumulated in the CCD 2 due to the dark current of the semiconductor element, these accumulated electric charges cause noise, so that the S/N ratio of the image signal is deteriorated. In the first time period of 201, since the CCD drive signal 110 is not outputted, the noise components are accumulated in the CCD 2 during this time period. As a result, in the next time period of 202, the highspeed CCD drive signal 110 is outputted and the noise components accumulated in this CCD 2 must be swept out.

Finally, the reason why the digital image signal is produced in synchronism with the transfer clock signal 106 within the time period of 203 will be explained as follows: In general, the personal computer 6 executes various process operations other than the process operation of the image signal entered from the image input apparatus. As a consequence, for example, even when the constant time transfer operation is carried out, for instance, the isochronous transfer mode executed in the USB interface control unit 4, such a fact is well known. That is, the transfer clock signal 106 never owns the completely constant time period, because of very small variations in a load of a CPU employed in this personal computer 6. Since both the transfer clock signal 110 and the A/D converter drive signal 111 are synchronized with the transfer clock signal 106, the digital image signal 103 can be transferred to the personal computer 6 without employing any buffer memory device. Also, another fact is known in this field. That is, when the CCD drive signal 110 does not own such a constant time period, the electric charge accumulation time in the CCD 2 is varied, resulting in image fluctuations. To the contrary, in accordance with this embodiment, although very small time variations are produced in the isochronous transfer mode of th USB interface control unit 4, these very small time variations never cause image fluctuations which may be visually confirmed by human eyes. Moreover, when a further highspeed interface defined by IEEE 1394 (trade name) specification is employed, the above-explained adverse influence may be furthermore mitigated.

As previously described, in the conventional image input apparatus for the personal computer, the CCD is driven in the constant time period in order to avoid the noise adverse influence caused by the dark current. To the contrary, in accordance with the present invention, since the CCD is driven in the high speed immediately before the image data is read out from the CCD so as to sweep out the accumulated electric charges, the driving operation of this CCD can be stopped while no imaging operation is carried out.

Also, in the conventional image input apparatus for the personal computer, both the CCD and the A/D converter are driven in the constant time period to read the image data, whereas the transfer clock used between this image input apparatus and the personal computer is not produced in a constant time period, due to the load variation of the CPU. As a result, the buffer memory device capable of storing thereinto the image data is necessarily provided between the A/D converter and the interface control unit. To the contrary, in accordance with the image input apparatus of the present invention, since the CCD 2 is driven in such a high speed immediately before the image data is read out from the CCD 2 so as to sweep out the electric charges accumulated in this CCD 2, the CCD 2 is no longer driven in such a constant time period. As a result, the buffer memory device is no longer required by synchronizing the drive signal for this CCD 2 with the transfer clock signal used between this image input apparatus and the personal computer.

As apparent from the foregoing description, in the image input apparatus of the present invention, the CCD is not required to be driven except that the imaging operation is carried out by driving this CCD. Furthermore, since the buffer memory device is no longer required, this image input apparatus can be made compact and in low cost, and further can be driven under low power consumption.

It is thus apparent that the present invention is not limited to the above embodiments but may be changed and modified without departing from the scope and spirit of the invention.

Finally, the present application claims the priority of Japanese Patent Application No. Hei10-071898 filed on Mar. 20, 1998, which is herein incorporated by reference.

What is claimed is:

1. An image input apparatus comprising:
   an image sensor for optically sensing an image of an object to produce an analog image signal;
   an A/D (analog-to-digital) converter for A/D-converting the analog image signal into a digital image signal;
   an interface control unit for converting the digital image signal into image data;
   an image sensor driving unit for driving said image sensor;
   an A/D converter driving unit for driving said A/D converter;
   a clock oscillator for oscillating a first clock signal;
   a clock switching control unit for controlling a supply a second clock signal to said image sensor driving unit and said A/D converter driving unit in response to said clock signal produced from said clock oscillator, in response to a transfer starting signal and in response to a transfer clock signal, the transfer starting signal and the transfer clock signal both supplied from said interface control unit; and
   a personal computer for receiving said image data converted by said interface control unit and for supplying said transfer starting signal to said interface control unit; wherein:
   said clock switching control unit includes:
   drive means for supplying said first clock signal produced from said clock oscillator to said image sensor driving unit, and also for not supplying said first clock signal to said A/D converter driving unit within a defined time period after said transfer starting signal is received.

2. An image input apparatus according to claim 1 wherein:
   said image sensor includes:
   a lens for focusing said image of the object; and
   a CCD (charge-coupled device) for receiving said image focused by said lens to produce said analog image signal.

3. An image input apparatus according to claim 1 wherein:
   said clock oscillator oscillates the first clock signal having a substantially constant frequency higher than the transfer clock signal.

4. An image input apparatus according to claim 1 wherein:
   said interface control unit is formed based upon the USB (universal serial bus) interface standard.

5. An image input apparatus according to claim 1 wherein:
   said interface control unit is formed based on the IEEE 1394 specification.

6. An image input apparatus comprising:
   an image sensor for optically sensing an image of an object to produce an analog image signal;

an A/D (analog-to-digital) converter for A/D-converting the analog image signal into a digital image signal;

an interface control unit for converting the digital image signal into image data;

an image sensor driving unit for driving said image sensor;

an A/D converter driving unit for driving said A/D converter;

a clock oscillator for oscillating a first clock signal;

a clock switching control unit for controlling a supply of a second clock signal to said image sensor driving unit and said A/D converter driving unit in response to said clock signal produced from said clock oscillator, in response to a transfer starting signal and in response to a transfer clock signal, the transfer starting signal and the transfer clock signal both supplied from said interface control unit; and a personal computer for receiving said image data converted by said interface control unit and for supplying said transfer starting signal to said interface control unit; wherein:

said clock switching control unit includes:

first drive means for supplying said first clock signal produced from said clock oscillator to said image sensor driving unit, and also for not supplying said first clock signal to said A/D converter driving unit within a first defined time period after said transfer starting signal is received; and second drive means for supplying said transfer clock signal to both said image sensor driving unit and said A/D converter driving unit within a second defined time period after said first defined time period has passed.

7. An image input apparatus according to claim 6 wherein:

said image sensor includes:

a lens for focusing said image of the object; and a CCD (charge-coupled device) for receiving said image focused by said lens to produce said analog image signal.

8. An image input apparatus according to claim 6 wherein:

said clock oscillator oscillates the first clock signal having a substantially constant frequency higher than the transfer clock signal.

9. An image input apparatus according to claim 6 wherein:

said interface control unit is formed based upon the USB (universal serial bus) interface standard.

10. An image input apparatus according to claim 6 wherein:

said interface control unit is formed based on the IEEE 1394 specification.

11. An image input apparatus comprising:

an image sensor which optically senses an image of an object to produce an analog image signal;

an A/D converter which receives and converts the analog image signal into a digital image signal;

an interface control unit which receives and converts the digital image signal into image data;

an image sensor driving unit which drives said image sensor;

an A/D converter driving unit which drives said A/D converter;

a clock oscillator which produces a first clock signal;

a personal computer which receives said image data converted by said interface control unit and supplies a transfer starting signal to said interface control unit, said interface control unit forwards said transfer starting signal to a clock switching control unit;

the clock switching control unit receives the first clock signal from the clock oscillator, receives the transfer starting signal, and receives a transfer clock signal from the interface control unit, the clock switching control unit controls a supply of a second clock signal to said image sensor driving unit and said A/D converter driving unit based on the first clock signal from the clock oscillator, the transfer starting signal, and the transfer clock signal; and the clock switching control unit supplies said first clock signal produced from said clock oscillator to said image sensor driving unit, and inhibits said first clock signal from reaching said A/D converter driving unit within a first defined time period after said transfer starting signal is received.

12. The image input apparatus as recited in claim 11, wherein the clock switching control unit supplies said transfer clock signal to both said image sensor driving unit and said A/D converter driving unit within a second defined time period after said first defined time period has passed.

13. The image input apparatus as recited in claim 12, wherein the transfer clock signal is of a lower frequency than said first clock signal produced from said first clock oscillator.

* * * * *